(12) United States Patent
Tang

(10) Patent No.: US 11,304,260 B2
(45) Date of Patent: Apr. 12, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/755,879

(22) PCT Filed: Oct. 20, 2017

(86) PCT No.: PCT/CN2017/107168
§ 371 (c)(1),
(2) Date: Apr. 13, 2020

(87) PCT Pub. No.: WO2019/075763
PCT Pub. Date: Apr. 25, 2019

(65) Prior Publication Data
US 2020/0296777 A1 Sep. 17, 2020

(51) Int. Cl.
*H04W 80/00* (2009.01)
*H04W 80/10* (2009.01)
(Continued)

(52) U.S. Cl.
CPC ........... *H04W 80/10* (2013.01); *H04M 15/66* (2013.01); *H04W 40/02* (2013.01);
(Continued)

(58) Field of Classification Search
CPC ..... H04W 80/10; H04W 76/12; H04W 40/02; H04W 40/248; H04W 48/18; H04M 15/66
See application file for complete search history.

(56) References Cited

U.S. PATENT DOCUMENTS 9,860,872 B2    1/2018  Himayat et al.
2015/0038150 A1 2/2015  Wang et al.
(Continued)

FOREIGN PATENT DOCUMENTS

CN    101030157 A    9/2007
CN    101651909 A    2/2010
(Continued)

OTHER PUBLICATIONS

Ericsson. "PDU Session vs PDU Session Resource" 3GPP TSG-RAN WG3 Meeting #97 R3-173219, Aug. 25, 2017 (Aug. 25, 2017), section 2, 8.2.1 and 17.3.4.4.
(Continued)

*Primary Examiner* — Khai M Nguyen
(74) *Attorney, Agent, or Firm* — Perkins Coie LLP

(57) ABSTRACT

Disclosed in the embodiments of the disclosure are a method for transmitting data, a terminal device and a network device. The method includes: a terminal device sends a first request message to a network device, the first request message being for applying for carrying out session establishment involving N data flows in a first Protocol Data Unit (PDU) session; and the terminal device receives a response message sent by the network device in response to the first request message, the response message being for indicating that the network device rejects to carry out the session establishment involving M data flows of the N data flows in the first PDU session, the N and the M being both a positive integer, and the N being greater than or equal to the M. The method, the terminal device and the network device pro-
(Continued)

400 | A network device receives a first request message sent by a terminal device, the first request message being for applying for carrying out, in a first PDU session, session establishment involving N data flows | 410

The network device sends a response message in response to the first request message to the terminal device, the response message being for indicating that the network device rejects to carry out, in the first PDU session, the session establishment involving M data flows of the N data flows, the N and the M being both a positive integer, and the N being greater than or equal to the M | 420 vided by the embodiments of the disclosure improve the performance of a communication system.

16 Claims, 7 Drawing Sheets

(51) Int. Cl.
    *H04M 15/00*     (2006.01)
    *H04W 40/24*     (2009.01)
    *H04W 48/18*     (2009.01)
    *H04W 76/12*     (2018.01)
    *H04W 40/02*     (2009.01)

(52) U.S. Cl.
    CPC ......... *H04W 40/248* (2013.01); *H04W 48/18* (2013.01); *H04W 76/12* (2018.02)

(56) References Cited

U.S. PATENT DOCUMENTS

| | | | |
|---|---|---|---|
| 2015/0351079 | A1 | 12/2015 | Himayat et al. |
| 2015/0373699 | A1 | 12/2015 | Xu et al. |
| 2017/0180259 | A1 | 6/2017 | Yu et al. |
| 2017/0303259 | A1 | 10/2017 | Lee et al. |
| 2018/0324577 | A1* | 11/2018 | Faccin .................. H04W 48/18 |
| 2019/0124181 | A1* | 4/2019 | Park .................. H04W 74/0833 |
| 2020/0120738 | A1* | 4/2020 | Kawasaki ............. H04W 76/18 |
| 2020/0178196 | A1* | 6/2020 | Wang .................... H04W 76/16 |
| 2020/0245405 | A1* | 7/2020 | Tang ..................... H04W 48/18 |
| 2020/0252900 | A1 | 8/2020 | Kim et al. |
| 2020/0296777 | A1 | 9/2020 | Tang |

FOREIGN PATENT DOCUMENTS

| | | |
|---|---|---|
| CN | 103428708 A | 12/2013 |
| CN | 103444148 A | 12/2013 |
| CN | 103546304 A | 1/2014 |
| CN | 106155818 A | 11/2016 |
| CN | 106465178 A | 2/2017 |
| CN | 106851856 A | 6/2017 |
| CN | 106900081 A | 6/2017 |
| CN | 107018194 A | 8/2017 |
| CN | 107018542 A | 8/2017 |
| EP | 3637944 A4 | 8/2020 |
| RU | 2574345 C2 | 2/2016 |
| WO | 2017142362 A1 | 8/2017 |

OTHER PUBLICATIONS

Oppo. "Updating for Clause 6.1.2.2 in TS 23503" 3GPP SA WG2 Meeting #123 S2-176999, Oct. 17, 2017 (Oct. 17, 2017), section 6.1.2.2.
Ericsson. "TS 23.501: Clean up of PCF and Reference Point Names for PCC" 3GPP SA WG2 Meeting #121 S2-173014, May 19, 2017 (May 19, 2017), section A.3.1.8 and A.4.1.
International Search Report in the international application No. PCT/CN2018/091888, dated Jul. 30, 2018.
International Search Report in the international application No. PCT/CN2017/107168, dated Jul. 13, 2018.
International Search Report in the international application No. PCT/CN2017/111688, dated Jul. 10, 2018.
3rd Generation Partnership Project; Technical Specification Group Services and System Aspects;Procedures for the 5G System;Stage 2 (Release 15); 3GPP TS 23.502 V1.2.0 (Sep. 2017).
3rd Generation Partnership Project; Technical Specification Group Services and System Aspects: Policy and Charging Control Framework for the 5G System; Stage 2 (Release 15); 3GPP TS 23.503 V0.3.0 (Sep. 2017).
Supplementary European Search Report in the European application No. 17928355.0, dated Sep. 11, 2020.
Written Opinion of the International Search Authority in the International application No. PCT/CN2018/091888, dated Jul. 30, 2018.
Written Opinion of the International Search Authority in the International application No. PCT/CN2017/107168, dated Jul. 13, 2018.
Written Opinion of the International Search Authority in the international application No. PCT/CN2017/111688, dated Jul. 10, 2018.
3rd Generation Partnership Project;Technical Specification Group Services and System Aspects;Policy and Charging Control Framework for the 5G System;Stage 2(Release 15), 3GPP TS 23.503 V0.2.0 (Sep. 2017).
Nokia et al.: "NAS transport: alternative 2 cleanup", 3GPP Draft; C1-174048, 3rd Generation Partnership Project (3GPP), Mobile Competence Centre; 650, Route Des Lucioles; F-06921 Sophia-Antipolis Cedex; France, vol. CT WG1, No. Kochi (India); Oct. 23, 2017-Oct. 27, 2017 Oct. 16, 2017 (Oct. 16, 2017), XP051349833, Retrieved from the Internet: URL: http://www.3gpp.org/ftp/tsg_ct/WG1_mm-cc-sm_ex-CN1/TSGC1_106_Kochi/docs/ [ retrfeved on Oct. 16, 2017] * Sections 9.4.2.2, 9.4.2.3, 9.4.3.2-9.4.7.3*.
Supplementary European Search Report in the European application No. 18868123.3, dated Oct. 14, 2020.
First Office Action of the Chinese application No. 202010099121.1, dated Nov. 3, 2020.
First Office Action of the Russian application No. 2020116371, dated Feb. 12, 2021.
First Office Action of the Canadian application No. 3079480, dated May 31, 2021. 4 pages.
Office Action of the Indian application No. 202017020778, dated Jun. 3, 2021. 5 pages with English translation.
First Office Action of the Chinese application No. 202010303770.9, dated Jun. 8, 2021. 12 pages with English translation.
TS23.501 v1.2.0, System Architecture for the 5G System, the Stage 2 (Release 15), 3GPP server publication date (Jul. 26, 2017) 166 pages.
First Office Action of the Korean application No. 10-2020-7014334, dated Jul. 29, 2021. 9 pages with English translation.
OPPO, "UE Route Selection Policy", SA WG2 Meeting #124 S2-178438, [online], Nov. 21, 2017, the Internet<URL: https://www.3gpp.org/ftp/tsg_sa/WG2_Arch/TSGS2_124_Reno/Docs/S2-178438.zip>. pages.
First Office Action of the Japanese application No. 2020-521884, dated Aug. 17, 2021. 10 pages with English translation.
First Office Action of the European application No. 18868123.3, dated Aug. 9, 2021. 8 pages.
First Office Action of the U.S. Appl. No. 16/850,844, dated Jun. 4, 2021. 25 pages.
Office Action of the Indian application No. 202017020780, dated Sep. 15, 2021. 6 pages with English translation.
Notice of Allowance of the U.S. Appl. No. 16/850,844, dated Sep. 27, 2021. 15 pages.
Second Office Action of the Chinese application No. 202010303770.9, dated Sep. 30, 2021. 11 pages with English translation.
First Office Action of the Taiwanese application No. 107136608, dated Nov. 15, 2021 22 pages with English translation.
First Office Action of the Japanese application No. 2020-521993, dated Feb. 15, 2022. 16 pages with English translation.
European Search Report in the European application No. 21196875.5, dated Feb. 2, 2022. 8 pages.
Second Office Action of the European application No. 18868123.3, dated Jan. 24, 2022. 7 pages.

* cited by examiner

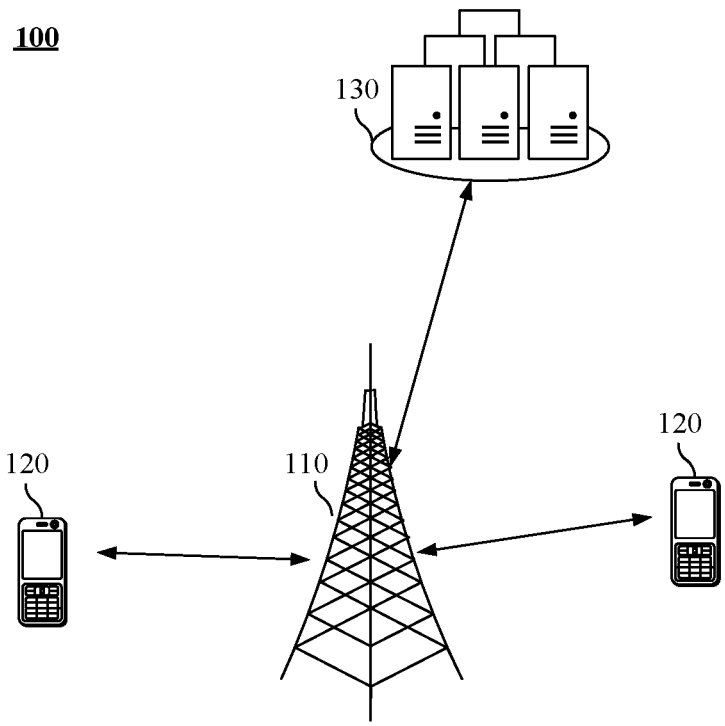

A terminal device sends a first request message to a network device, the first request message being for applying for carrying out, in a first PDU session, session establishment involving N data flows ~210

The terminal device receives a response message sent by the network device in response to the first request message, the response message being for indicating that the network device rejects to carry out, in the first PDU session, the session establishment involving M data flows of the N data flows, the N and the M being both a positive integer, and the N being greater than or equal to the M ~220

FIG. 2

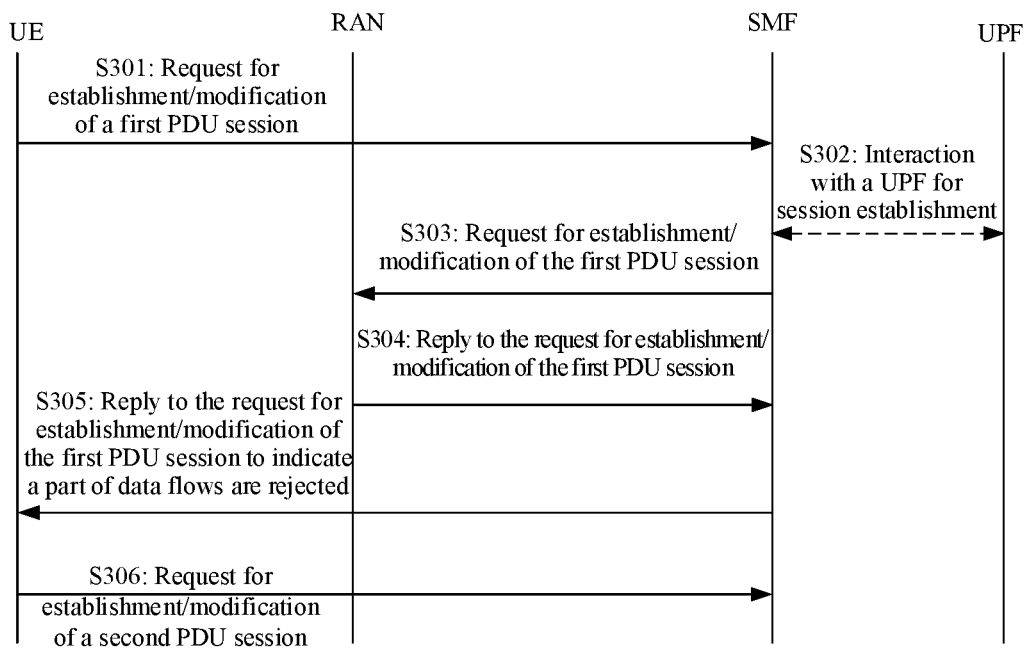

FIG. 3

400
- 410: A network device receives a first request message sent by a terminal device, the first request message being for applying for carrying out, in a first PDU session, session establishment involving N data flows
- 420: The network device sends a response message in response to the first request message to the terminal device, the response message being for indicating that the network device rejects to carry out, in the first PDU session, the session establishment involving M data flows of the N data flows, the N and the M being both a positive integer, and the N being greater than or equal to the M

FIG. 4

500
- 510: A terminal device acquires, according to an ID of each rule in at least one rule in a URSP, the at least one rule respectively
- 520: The terminal device initiates establishment or modification of at least one PDU session in one-to-one correspondence with the at least one rule to a network device respectively according to the at least one rule

FIG. 5

DATA TRANSMISSION METHOD, TERMINAL DEVICE, AND NETWORK DEVICE

CROSS-REFERENCE TO RELATED APPLICATIONS

The present application is a U.S. National Phase Entry of International PCT Application No. PCT/CN2017/107168 filed on Oct. 20, 2017, and entitled "DATA TRANSMISSION METHOD, TERMINAL DEVICE, AND NETWORK DEVICE", the content of which is hereby incorporated by reference in its entirety.

TECHNICAL FIELD

The embodiments of the disclosure relate to the field of communications, and in particular to a method for transmitting data, a terminal device and a network device.

BACKGROUND

In a radio communication network, a terminal device cannot carry out a relevant service until a Protocol Data Unit (PDU) session is established. In a related art, after the terminal device initiates a session establishment process to a network device, the terminal device cannot know the condition of session establishment, resulting in that the terminal device cannot adjust a session establishment policy timely and the performance of a communication system may be degraded.

SUMMARY

In view of this, the embodiments of the disclosure provide a method for transmitting data, a terminal device and a network device, to improve the performance of a communication system.

A first aspect provides a method for transmitting data, which may include that: a terminal device sends a first request message to a network device, the first request message being for applying for carrying out, in a first PDU session, session establishment involving N data flows; and the terminal device receives a response message sent by the network device in response to the first request message, the response message being for indicating that the network device rejects to carry out session establishment involving M data flows of the N data flows in the first PDU session, the N and the M being both a positive integer, and the N being greater than or equal to the M.

By feeding the condition of session establishment back to the terminal device by the network device, the terminal device can adjust a session establishment policy timely, and the performance of the communication system can be improved.

In a possible implementation, the response message may include a rejection cause value, and the rejection cause value may be for indicating that the first PDU session does not support the M data flows.

The rejection cause value may be carried in the response message to enable the terminal device to know according to the response message that no support is from the PDU session, the terminal device may adjust the PDU session appropriately and re-initiate session establishment or modification to the network device. Therefore, the possibility of successfully establishing a PDU session can be improved.

In a possible implementation, the response message may include an identifier (ID) of each data flow of the M data flows.

In a possible implementation, the method may further include that: the terminal device sends a second request message to the network device in response to the response message, the second request message being for applying for carrying out, in a second PDU session, session establishment involving at least one data flow of the M data flows.

In a possible implementation, the first request message may include an ID of the first PDU session, the second request message may include an ID of the second PDU session, and the second PDU session may be the first PDU session after the ID of the first PDU session is adjusted.

In a possible implementation, before the terminal device responds to the response message, the method may further include: the terminal device adjusts an establishment parameter of the second PDU session rather than the first PDU session according to the M data flows.

In a possible implementation, the response message may include an ID of the second PDU session.

In a possible implementation, the network device may be a Session Management Function (SMF) device.

A second aspect provides a method for transmitting data, which may include: a network device receives a first request message sent by a terminal device, the first request message being for applying for carrying out, in a first PDU session, session establishment involving N data flows; and the network device sends a response message in response to the first request message to the terminal device, the response message being for indicating that the network device rejects to carry out, in the first PDU session, session establishment involving M data flows of the N data flows, the N and the M being both a positive integer, and the N being greater than or equal to the M.

In a possible implementation, the response message may include a rejection cause value, and the rejection cause value may be for indicating that the first PDU session does not support the M data flows.

In a possible implementation, the response message may include an identifier (ID) of each data flow of the M data flows.

In a possible implementation, the method may further include: the network device receives a second request message sent by the terminal device, the second request message being for applying for carrying out, in a second PDU session, session establishment involving at least one data flow of the M data flows.

In a possible implementation, the response message may include an ID of a second PDU session, rather than the first PDU session, suggested by the network device.

In a possible implementation, the network device may be an SMF device, and the method may further include: the SMF device triggers, an access network device according to the first request message to carry out, in the first PDU session, the session establishment involving the N data flows; and the SMF device receives a data flow list sent by the access network device and corresponding to the first PDU session, the data flow list including the M data flows or (N-M) data flows of the N data flows received by the first PDU session.

A third aspect provides a method for transmitting data, which may include: a terminal device acquires, according to an ID of each rule in at least one rule in a UE Route Selection Policy (URSP), the at least one rule respectively; and the terminal device initiates establishment or modification of at least one PDU session in one-to-one correspondence with the at least one rule to a network device respectively according to the at least one rule.

Since IDs of rules are introduced, the terminal device can acquire a rule according to the IDs of the rules, and the network device no longer needs to send all rules to the terminal device at a time, so that the pressure of the network device can be relieved, and the communication flexibility can be improved.

In a possible implementation, the at least one rule may be multiple rules, and the operation that the terminal device respectively initiates establishment or modification of multiple PDU sessions in one-to-one correspondence with the multiple rules to a network device according to the multiple rules may include: the terminal device sequentially initiates the establishment or modification of the multiple PDU sessions to the network device according to precedences of the multiple rules.

Optionally, the precedence of each rule may be indicated by the ID of each rule.

In a possible implementation, the first rule in the at least one rule may include at least one parameter of the following parameters: a Radio Access Technology (RAT), a session and service continuity mode, a Single-Network Slice Selection Assistance Information (S-NSSAI), a shunt type, a Data Network Name (DNN) and a data flow filter.

In a possible implementation, the first parameter in the at least one parameter may include multiple values for indicating the precedences, and the operation that the terminal device initiates establishment or modification of a first PDU session to a network device according to the first rule may include: the terminal device initiates the establishment or modification of the first PDU session to the network device according to the precedences of the multiple values.

In a possible implementation, the operation that the terminal device initiates establishment or modification of a first PDU session to a network device according to a first rule in the at least one rule may include: the terminal device sends a first request message to the network device according to the first rule, the first request message being for requesting the network device to carry out, in the first PDU session, session establishment involving N data flows; and after the terminal device initiates the establishment or modification of the first PDU session to the network device according to the first rule, the method may further include: the terminal device receives a response message sent by the network device in response to the first request message, the response message being for indicating that the network device rejects to carry out the session establishment involving M data flows of the N data flows in the first PDU session, the N and the M being both a positive integer, and the N being greater than or equal to the M.

In a possible implementation, the response message may include a rejection cause value, and the rejection cause value may be for indicating at least one condition of the following conditions: not supported PDU session, not allowed RAT access, not supported session or service continuity mode, S-NSSAI is wrong, not supported DNN, and an ID of the PDU session fails to be identified.

In a possible implementation, the method may further include: the terminal device adjusts, in response to the response message, a value of a parameter of the first rule corresponding to the rejection cause value; and the terminal device sends a second request message to the network device according to the adjusted first rule, the second request message being for requesting the network device to carry out, in the first PDU session, session establishment involving at least one data flow of the M data flows.

In a possible implementation, the parameter of the first rule corresponding to the rejection cause value may include multiple values indicative of precedences, and the operation that the terminal device adjusts, in response to the response message, a value of a parameter of the first rule corresponding to the rejection cause value may include: the terminal device adjusts, in response to the response message, a value of a parameter of a first URSP corresponding to the rejection cause value to a value having a precedence higher than that of a value when establishment of a first PDU session was initiated last time.

In a possible implementation, the response message may include the value of the parameter of the first rule corresponding to the rejection cause value and suggested by the network device, and the operation that the terminal device adjusts, in response to the response message, a value of a parameter of a first URSP corresponding to the rejection cause value may include: the terminal device adjusts the value of the parameter of the first rule corresponding to the rejection cause value to a value of a parameter of the first rule corresponding to the rejection cause value and suggested by the network device.

In a possible implementation, the method may further include: the terminal device receives a second rule other than the first rule in the at least one rule in the URSP and the ID of the first rule from the network device; and the operation that the terminal device acquires, according to an ID of a first rule, the first rule may include: the terminal device acquires the first rule via a user plane according to the ID of the first rule after the second PDU session corresponding to the second rule is established, or the terminal device triggers the network device according to the ID of the first rule to send the first rule via a control plane.

In a possible implementation, the method may further include: the terminal device receives an ID of a server; and the operation that the terminal device acquires the first rule via a user plane according to the ID of the first rule after the second PDU session corresponding to the second rule is established may include: the terminal device acquires the first rule via the user plane according to the ID of the first rule and the ID of the server after the second PDU session corresponding to the second rule is established.

In a possible implementation, the precedence of the second rule may be higher than that of the first rule.

In a possible implementation, the operation that a terminal device acquires, according to an ID of each rule in at least one rule in a URSP, the at least one rule may include: the terminal device acquires the at least one rule according to the ID of each rule in the at least one rule in a process when the terminal device performs network registration.

A fourth aspect provides a method for transmitting data, which may include: a network device sends multiple rules in a URSP to a terminal device via multiple messages in a process when the terminal device performs network registration.

By acquiring the URSP policy in segmentations, the pressure of network can be effectively reduced, and the communication flexibility can be improved.

In a possible implementation, the operation that a network device sends multiple rules in a URSP to a terminal device via multiple messages in a process when the terminal device performs network registration may include: in the process when the terminal device performs the network registration, the network device sequentially sends the multiple rules to the terminal device via the multiple messages on a control plane according to precedences of the multiple rules.

In a possible implementation, the network device may be a Policy Control Function (PCF) device.

A fifth aspect provides a method for transmitting data, which may include: in a process when a terminal device performs network registration, a network device sends a second rule other than a first rule in a URSP and an ID of the first rule to the terminal device, so that the terminal device acquires the first rule via a user plane according to the ID of the first rule after a second Protocol Data Unit (PDU) session corresponding to the second rule is established.

By acquiring the URSP policy in segmentations, the pressure of network can be effectively reduced, and the communication flexibility can be improved.

In a possible implementation, the method may further include: the network device sends an ID of a server to the terminal device, so that the terminal device acquires the first rule via the user plane according to the ID of the first rule and the ID of the server after the second PDU session corresponding to the second rule is established.

In a possible implementation, the network device may be a PCF device.

A sixth aspect provides a terminal device, configured to execute the method in the first aspect or any possible implementation of the first aspect. Specifically, the terminal device may include a unit configured to execute the method in the first aspect or any possible implementation of the first aspect.

A seventh aspect provides a network device, configured to execute the method in the second aspect or any possible implementation of the second aspect. Specifically, the network device may include a unit configured to execute the method in the second aspect or any possible implementation of the second aspect.

An eighth aspect provides a terminal device, configured to execute the method in the third aspect or any possible implementation of the third aspect. Specifically, the terminal device may include a unit configured to execute the method in the third aspect or any possible implementation of the third aspect.

A ninth aspect provides a network device, configured to execute the method in the fourth aspect or any possible implementation of the fourth aspect. Specifically, the network device may include a unit configured to execute the method in the fourth aspect or any possible implementation of the fourth aspect.

A tenth aspect provides a network device, configured to execute the method in the fifth aspect or any possible implementation of the fifth aspect. Specifically, the network device may include a unit configured to execute the method in the fifth aspect or any possible implementation of the fifth aspect.

An eleventh aspect provides a terminal device, which may include: a memory, a processor, an input interface and an output interface. The memory, the processor, the input interface and the output interface can be connected via a bus system. The memory is configured to store an instruction; and the processor is configured to execute the instruction stored by the memory, and configured to execute the method in the first aspect or any possible implementation of the first aspect.

A twelfth aspect provides a network device, which may include: a memory, a processor, an input interface and an output interface. The memory, the processor, the input interface and the output interface can be connected via a bus system. The memory is configured to store an instruction; and the processor is configured to execute the instruction stored by the memory, and configured to execute the method in the second aspect or any possible implementation of the second aspect.

A thirteenth aspect provides a terminal device, which may include: a memory, a processor, an input interface and an output interface. The memory, the processor, the input interface and the output interface can be connected via a bus system. The memory is configured to store an instruction; and the processor is configured to execute the instruction stored by the memory, and configured to execute the method in the third aspect or any possible implementation of the third aspect.

A fourteenth aspect provides a network device, which may include: a memory, a processor, an input interface and an output interface. The memory, the processor, the input interface and the output interface can be connected via a bus system. The memory is configured to store an instruction; and the processor is configured to execute the instruction stored by the memory, and configured to execute the method in the fourth aspect or any possible implementation of the fourth aspect.

A fifteenth aspect provides a network device, which may include: a memory, a processor, an input interface and an output interface. The memory, the processor, the input interface and the output interface can be connected via a bus system. The memory is configured to store an instruction; and the processor is configured to execute the instruction stored by the memory, and configured to execute the method in the fifth aspect or any possible implementation of the fifth aspect.

A sixteenth aspect provides a computer storage medium, configured to store a computer software instruction for executing the method in the first aspect or any possible implementation of the first aspect, or the method in the second aspect or any possible implementation of the second aspect, or the method in the third aspect or any possible implementation of the third aspect, or the method in the fourth aspect or any possible implementation of the fourth aspect, or the method in the fifth aspect or any possible implementation of the fifth aspect, and including a program designed to execute the above aspects.

A seventeenth aspect provides a computer program product including an instruction; and the computer program product can enable, when running on a computer, the computer to execute the method in the first aspect or any possible implementation of the first aspect, or the method in the second aspect or any possible implementation of the second aspect, or the method in the third aspect or any possible implementation of the third aspect, or the method in the fourth aspect or any possible implementation of the fourth aspect, or the method in the fifth aspect or any possible implementation of the fifth aspect.

These aspects or other aspects of the disclosure will become more apparent in the description of the following embodiments.

BRIEF DESCRIPTION OF THE DRAWINGS

FIG. 1 illustrates a schematic diagram of an application scene according to an embodiment of the disclosure.

FIG. 2 illustrates a schematic block diagram of a method for transmitting data according to an embodiment of the disclosure.

FIG. 3 illustrates another schematic block diagram of a method for transmitting data according to an embodiment of the disclosure.

FIG. 4 illustrates a still another schematic block diagram of a method for transmitting data according to an embodiment of the disclosure.

FIG. 5 illustrates a still another schematic block diagram of a method for transmitting data according to an embodiment of the disclosure.

DETAILED DESCRIPTION

Figure 6:
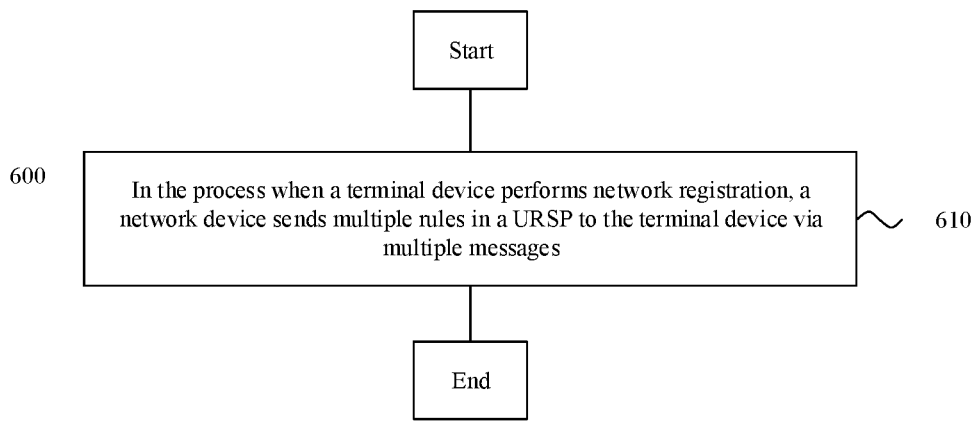
FIG. 6 illustrates a still another schematic block diagram of a method for transmitting data according to an embodiment of the disclosure.

A clear and complete description of the technical solutions in the embodiments of the disclosure will be given below, in combination with the accompanying drawings in the embodiments of the disclosure.

It is to be understood that the technical solutions in the embodiments of the disclosure can be applied in various communications systems, such as a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, a New Radio (NR) system or a future 5th Generation (5G) system.

Particularly, the technical solutions in the embodiments of the disclosure can be applied to various communication systems based on a non-orthogonal multiple access technology, such as a Sparse Code Multiple Access (SCMA) system and a Low Density Signature (LDS) system. The SCMA system and the LDS system can also be referred to as other names in the field of communications. Further, the technical solutions in the embodiments of the disclosure can be applied to multi-carrier transmission systems adopting the non-orthogonal multiple access technology, such as an Orthogonal Frequency Division Multiplexing (OFDM) system, a Filter Bank Multi-Carrier (FBMC) system, a Generalized Frequency Division Multiplexing (GFDM) system and a Filtered-OFDM (F-OFDM) system.

FIG. 1 illustrates a wireless communication system 100 to which the embodiments of the disclosure are applied. The wireless communication system 100 may include an access network device 110. The access network device 110 may be a device for communicating with a terminal device. The access network device 110 may provide communication coverage for a specific geographical region and may communicate with the terminal device (for example, User Equipment (UE)) in the coverage. Optionally, the access network device 110 may be a Next Generation Radio Access Network (NG RAN), or a gNB in an NR system, or a wireless controller in a Cloud Radio Access Network (CRAN). Or the access network device may be a relay station, an access point, a vehicle-mounted device, a wearable device, or a network device in a future evolved Public Land Mobile Network (PLMN) or the like. Optionally, the access network device 110 may also be a base station in an LTE system, for example, an Evolved Universal Terrestrial Radio Access Network (E-UTRAN) device.

The wireless communication system 100 may further include at least one terminal device 120 within the coverage of the access network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

The wireless communication system 100 may further include a core network device 130 for communicating with the access network device. Optionally, the core network device 130 may be a 5G core network device, for example, an Access and Mobility Management Function (AMF) or an SMF. Optionally, the core network device 130 may also be an Evolved Packet Core (EPC) device in an LTE network, such as a Session Management Function+Core Packet Gateway (SMF+PGW-C) device.

It is to be understood that the SMF+PGW-C can simultaneously implement functions which can be implemented by the SMF and the PGW-C.

Optionally, in the embodiments of the disclosure, the AMF may exchange information with the SMF, for example, the SMF may acquire some information of an RAN from the AMF.

Optionally, in the embodiments of the disclosure, the AMF may acquire a fall-back ID from the RAN, or acquire a message indicative of terminal-device related unsuccessful establishment of a first bearer/flow.

FIG. 1 schematically illustrates one access network device, one core network device and two terminal devices. Optionally, the wireless communication system 100 may include multiple access network devices, and other numbers of terminal devices may be included within a coverage range of each access network device, to which no limits are set in the embodiments of the disclosure.

Optionally, the wireless communication system 100 may further include a Mobile Management Entity (MME), a Unified Data Management (UDM), an Authentication Server Function (AUSF), a User Plane Function (UPF), a Signaling Gateway (SGW) and other network entities, to which no limits are set in the embodiments of the disclosure.

It is to be understood that the terms "system" and "network" in the specification are often used interchangeably. The term "and/or" in this specification is only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

FIG. 2 illustrates a schematic block diagram of a method 200 for transmitting data according to an embodiment of the disclosure. The terminal device shown in FIG. 2 may be the terminal device shown in FIG. 1, and the network device shown in FIG. 2 may be the core network device shown in FIG. 1. The method 200 may include the following contents in part or as a whole.

At S210: a terminal device sends a first request message to a network device, the first request message being for applying for carrying out, in a first PDU session, session establishment involving N data flows.

At S220: the terminal device receives a response message sent by the network device in response to the first request message, the response message being for indicating that the network device rejects to carry out, in the first PDU session, session establishment involving M data flows of the N data flows, the N and the M being both a positive integer, and the N being greater than or equal to the M.

Specifically, when the terminal device applies for establishing a session in one PDU session for multiple data flows, the terminal device may send a Non-Access Stratum (NAS) message to the core network device. The NAS message may be used for requesting establishment or modification of a certain PDU session, and the NAS message may include an ID of the PDU session. Upon the NAS message is received, the core network device can know which PDU session establishes a session of data flows. It is to be understood that one terminal device may have multiple PDU sessions, and this embodiment of the disclosure describes a PDU session in multiple PDU sessions of one terminal device. After the core network device receives from the terminal device the request for session establishment or modification, the core network device may trigger the access network device to establish or modify multiple data flows in the PDU session. Then, the access network device can determine, according to the request, which data flows may be subjected to the session establishment in the PDU session, and which data flows cannot be subjected to the session establishment in the PDU session; and then, the access network device may send a data flow list to the core network device. The data flow list may be a data flow list accepted by the access network device, or may be a data flow list rejected by the access network device. Upon the reception of the data flow list, the core network device may send the response message to the terminal device, to enable the terminal device to know that the network device rejects part of data flows in the requested data flows. After the part of data flows are rejected, the terminal device may make an adjustment, for example, the terminal device may adjust a parameter for establishing the PDU session, or change the PDU session to re-initiate the session establishment for the rejected data flows, etc.

Therefore, according to the method for transmitting data in this embodiment of the disclosure, since the condition of session establishment can be fed back to the terminal device, the terminal device can adjust a session establishment policy timely, and thus the performance of the communication system can be improved.

It is to be understood that this embodiment of the disclosure may be applied to a 5G communication system. In other words, the core network device in this embodiment of disclosure may be the SMF in 5G Optionally, in the session establishment process, the SMF may interact with a UPF for the session establishment.

Optionally, the response message may include a rejection cause value, and the rejection cause value may be for indicating that the first PDU session does not support the M data flows.

Generally, the network side may reject establishment of one or more flows in one PDU session, which may lie in many reasons, for example, the PDU session does not allow such flows, an RAT access does not allow such flows, a session or service continuity mode is not supported, S-NS-SAI is wrong, the DNN does not support such flows, and the identifier of the PDU session fails to be identified. In this embodiment of the disclosure, the response message sent by the network side to the terminal device may include a reason value, specifically, the network side may agree with the terminal device in advance to use several bits to represent the above various reasons, for example, 0001 may be used to represent no allowance from the PDU session, and 0010 may be used to represent no allowance from an RAT access, etc. The reason that the PDU session does not allow such flows may be that the PDU session is full and the data flows cannot be added to the PDU session; and the cases that no allowance is from the PDU session and a PDU session identifier fails to be identified may be seen as that no support is given by the PDU session. Upon that the terminal device knows the reason is that no support is given by the PDU session according to the response message, the terminal device may adjust the PDU session appropriately and re-initiate session establishment or modification to the network device. Therefore, the possibility of successfully establishing the PDU session can be improved.

Optionally, the response message may include an ID of each data flow of the M data flows.

Further, the network device may further indicate, to the terminal device via the response message, which data flows are rejected by the network side. For example, a data flow list accepted by the network device may be carried in the response message, so that the terminal device may determine which data flows are rejected according to the accepted data flow list. Or, a data flow list rejected by the network device may be included in the response message. A data flow list may include IDs of multiple data flows.

Upon that the terminal device knows which data flows are rejected, the terminal device may adjust the session particularly for these rejected data flows. Or, the terminal device does not need to know which data flows are rejected. Once knowing the rejection cause, the terminal device can adjust the session for all data flows.

Optionally, the method may further include: the terminal device sends a second request message to the network device in response to the response message, the second request message being for applying for carrying out, in a second PDU session, session establishment involving at least one data flow of the M data flows.

Optionally, the first request message may include the ID of the first PDU session, the second request message may include the ID of the second PDU session, and the second PDU session may be the first PDU session after the ID of the first PDU session is adjusted.

Optionally, before the terminal device responds to the response message, the method may further include: the terminal device adjusts an establishment parameter of the second PDU session rather than the first PDU session according to the M data flows.

As can be seen from the above, after the terminal device knows the rejected data flow list and the rejection cause is that no support is from the PDU session, the terminal device may adjust the session establishment involving the data flows. For example, in a case that the terminal device knows that the ID of the last PDU session fails to be identified by a local network, the terminal device may generate a new ID, and carry out the session establishment again for the rejected data flows by using a content of the last PDU session. Specifically, in a case that the local network identifies that a PDU session identifier is 1-100 and the ID of the last PDU session is 101, the local network cannot identify the ID of the PDU session, and then the network side may notify the terminal device of that the ID of the PDU session fails to be identified, and the terminal device may generate a new ID of the PDU session between 1 and 100, reuse the PDU session to initiate request for a session establishment or modification, and include the newly generated ID of the PDU session into the request. For another example, in a case that the terminal device knows that the last PDU session does not allow the rejected data flows, the terminal device may bind the rejected data flows to another PDU session and re-initiate the establishment of the PDU session. Specifically, the terminal device may modify an establishment parameter of the another PDU session, and associate the rejected data flows with the another PDU session.

Optionally, the response message may include the ID of the second PDU session.

Specifically, once the network device determines that some data flows are rejected due to no support from the PDU session, the network device may send a suggested PDU session to the terminal device, for example, the network device may directly include the ID of the suggested PDU session into the response message. Or, in a case that the network device determines that the ID of the PDU session fails to be identified, the network device may send the ID of the suggested PDU session to the terminal device. In brief, the network device may send a suggested value of each parameter corresponding to the rejection cause value to the terminal device, and this embodiment of the disclosure is not limited thereto.

The flowchart of the method 300 for transmitting data in this embodiment of the disclosure will be described below in detail in combination with FIG. 3. The method is described with a 5G communication system as an example, and the method 300 may include the following contents in part or as a whole.

At S301: a UE sends a request for establishment or modification of a first PDU session to an SMF, the NAS message including an ID of the first PDU session.

At S302: the SMF may interact with a UPF for session establishment after the request for establishment or modification of the first PDU session is received.

At S303: the SMF may trigger an RAN for session establishment or modification after the request for establishment or modification of the first PDU session is received.

At S304: the RAN may make a reply to the SMF after the session establishment is completed, the reply including an accepted or rejected flow list.

At S305: after the reply of the RAN is received, the SMF may make a reply to the UE; the reply may include a rejected flow list which may be rejected completely or partially, or the replay may include a rejection cause, or may include a suggested value, that is, a suggested PDU session or an ID of the suggested PDU session.

At S306: after the reply is received, the UE may make an adjustment correspondingly, and re-initiate establishment or modification of the PDU session. Specifically, the UE may send a request for establishment or modification of a second PDU session to the SMF, and the request may include a new ID of the PDU session (corresponding to the case that a PDU session identifier fails to be identified), and may also include the ID of the second PDU session (corresponding to the case that the PDU session is changed) and previously rejected flows.

FIG. 4 illustrates a schematic block diagram of a method 400 for transmitting data according to an embodiment of the disclosure. As shown in FIG. 4, the method 400 may include the following contents in part or as a whole.

At S410: a network device receives a first request message sent by a terminal device, the first request message being for applying for carrying out, in a first PDU session, session establishment involving N data flows.

At S420: the network device sends a response message in response to the first request message to the terminal device, the response message being for indicating that the network device rejects to carry out session establishment involving M data flows of the N data flows in the first PDU session, the N and the M being both a positive integer, and the N being greater than or equal to the M.

Therefore, according to the method for transmitting data in this embodiment of the disclosure, since the condition of session establishment can be fed back to a terminal device, the terminal device can adjust a session establishment policy timely, and thus the performance of the communication system can be improved.

Optionally, the response message may include a rejection cause value, and the rejection cause value may be for indicating that the first PDU session does not support the M data flows.

Optionally, the response message may include an ID of each data flow of the M data flows.

Optionally, the method may further include: the network device receives a second request message sent by the terminal device, the second request message being for applying for carrying out, in a second PDU session, session establishment involving at least one data flow of the M data flows.

Optionally, the response message may include the ID of the second PDU session, rather than the first PDU session, suggested by the network device.

Optionally, the network device may be an SMF device, and the method may further include: the SMF device triggers an access network device according to the first request message to carry out the session establishment involving the N data flows in the first PDU session; and the SMF device receives a data flow list sent by the access network device and corresponding to the first PDU session, the data flow list including the M data flows or (N-M) data flows of the N data flows received by the first PDU session.

It is to be understood that the interaction between the network device and the terminal device, relevant characteristics and functions and the like described from the angle of the network device correspond to the relevant characteristics and functions described from the angle of the terminal device. Relevant content has been described in detail in the method 200 and the method 300, and will not be repeated herein.

It is further to be understood that the numbers of the foregoing processes in various embodiments of the disclosure do not mean execution sequences. The execution sequences of the processes may be determined according to functions and internal logics of the processes, and should not be construed as any limitation to the implementation processes of the embodiments of the disclosure.

FIG. 5 illustrates a schematic block diagram of a method 500 for transmitting data according to an embodiment of the disclosure. As shown in FIG. 5, the method 500 may include the following contents in part or as a whole.

At S510: a terminal device acquires, according to an ID of each rule in at least one rule in a URSP, the at least one rule respectively.

At S520: the terminal device initiates establishment or modification of at least one PDU session in one-to-one correspondence with the at least one rule to a network device respectively according to the at least one rule.

Specifically, the concept of the URSP is introduced in 5G, and the URSP policy specifies a routing policy of UE for different data flows. Each terminal device has one URSP, each URSP may have multiple rules, and the terminal device may initiate establishment of one PDU session based on each rule. Specifically, the terminal device may initiate establishment or modification of one PDU session based on one or more parameters in a rule. For example, the one or more parameters may be RAT access, session or service continuity, network slicing or shunting, etc. The parameter in the rule may be measured by a core network, and sent to the terminal device during a registration process of the terminal device, and the terminal device may initiates establishment or modification of the session accordingly. In this embodiment of the disclosure, since IDs of the rules are introduced, the terminal device may acquire some rule according to the IDs of the rules, and the network device no longer needs to send all rules to the terminal device at a time, so that the pressure of the network device can be relieved, and the communication flexibility can be improved.

Optionally, the at least one rule may be multiple rules, and the operation that the terminal device initiates establishment or modification of multiple PDU sessions in one-to-one correspondence with the multiple rules to a network device respectively according to the multiple rules may include: the terminal device sequentially initiates the establishment or modification of the multiple PDU sessions to the network device according to precedences of the multiple rules.

Specifically, in this embodiment of the disclosure, the concept of precedence may be introduced to the multiple rules in the URSP, that is, the terminal device may preferentially initiate, based on a rule, establishment or modification of a PDU session corresponding to the rule to the network device. The terminal device may also classify the multiple rules and prioritize each type of rule. The PDU sessions initiated in the same type of rule may be not needed to be sorted, that is, the PDU sessions can be initiated at any sequence.

Optionally, the precedence of each rule may be indicated by the ID of each rule. For example, once the terminal device obtains the rule #1, the terminal device may consider that the precedence of the rule #1 is the highest.

Optionally, the first rule in the at least one rule may include at least one parameter of the following parameters: an RAT, a session and service continuity mode, an S-NSSAI, a shunt type, a DNN and a data flow filter.

It is to be understood that the first rule is described herein as an example, each rule in the URSP may include any combination of the above-mentioned various parameters, and the above-mentioned various parameters are merely for systematic description and are not limited by this embodiment of the disclosure.

Optionally, the first parameter in the at least one parameter may include multiple values for indicating precedences, and the operation that the terminal device initiates establishment or modification of a first PDU session to a network device according to the first rule may include: the terminal device initiates the establishment or modification of the first PDU session to the network device according to the precedences of the multiple values.

For example, the first rule may include access RAT, a session and service continuity mode and S-NSSAI, and the value of the access RAT is $3^{rd}$ Generation Partnership Project (3GPP) access and Wireless Local Area Networks (WLAN)) access. The session and service continuity mode may include mode 3 and mode 2, and the S-NSSAI may include S-NSSAI-a and S-NSSAI-b. The precedence of the value of each parameter may be sorted, for example, the access RAT may first use the 3GPP access, the S-NSSAI may first use the S-NSSAI-a, and the session and service continuity mode may first use the mode 3, etc. Once the network device has a feedback that a value of a parameter is inappropriate, the terminal device may adjust the value to another value. When establishment or modification of the PDU session is initiated for the first time, the terminal device may randomly select a value of a parameter in the rule corresponding to the PDU session. The terminal device may also directly select a value of a parameter having a higher precedence, to improve the possibility of successful establishment of the PDU session. In a case that the terminal device randomly selects a value of a parameter when initiating the establishment or modification of the PDU session for the first time, the terminal device may select a value of a parameter having a higher precedence and re-initiate the PDU session request, in response to that the network device rejects the request for the PDU session because the randomly selected parameter does not meet the requirement.

Optionally, the operation that the terminal device initiates establishment or modification of a first PDU session to a network device according to a first rule in the at least one rule may include: the terminal device sends a first request message to the network device according to the first rule, the first request message being for requesting the network device to carry out session establishment involving N data flows in the first PDU session; and after the terminal device initiates the establishment or modification of the first PDU session to the network device according to the first rule, the method may further include: the terminal device receives a response message sent by the network device in response to the first request message, the response message being for indicating that the network device rejects to carry out the session establishment involving M data flows of the N data flows in the first PDU session, the N and the M being both a positive integer, and the N being greater than or equal to the M.

Optionally, the response message may include a rejection cause value, and the rejection cause value may be for indicating at least one condition of the following conditions: not supported PDU session, not allowed RAT access, not supported session or service continuity mode, S-NSSAI is wrong, not supported DNN, and an ID of the PDU session fails to be identified.

Generally, the network side may reject the establishment of one or more flows in one PDU session, which may lie in many reasons. For example, the reason may be that the parameter in the rule corresponding to the PDU session in the URSP does not satisfy the requirement, such as no support is from the PDU session, no allowance is from an RAT access, session or service continuity is not satisfied, S-NSSAI is wrong, and no support is from the DNN, or the reason may also be that the ID of the PDU session fails to be identified. In this embodiment of the disclosure, the response message sent by the network side to the terminal device may include a reason value, specifically, the network side may agree with the terminal device in advance to use several bits to represent the above various reasons, for example, 0001 may represent no allowance from the PDU session, and 0010 may represent no allowance from an RAT access, etc. Once the terminal device knows that a parameter in a rule in the URSP does not meet the requirement, the terminal device may adjust the value of the parameter.

Optionally, the method may further include: the terminal device adjusts, in response to the response message, a value of a parameter of the first rule corresponding to the rejection cause value; and the terminal device sends a second request message to the network device according to the adjusted first rule, the second request message being for requesting the network device to carry out, in the first PDU session, session establishment involving at least one data flow of the M data flows.

Optionally, the parameter of the first rule corresponding to the rejection cause value may include multiple values indicative of precedences, and the operation that the terminal device adjusts, in response to the response message, a value of a parameter of the first rule corresponding to the rejection cause value may include: the terminal device adjusts, in response to the response message, the value of the parameter of the first URSP corresponding to the rejection cause value to a value having a higher precedence than that when establishment of a first PDU session was initiated last time.

Optionally, the response message may include the value of the parameter of the first rule corresponding to the rejection cause value and suggested by the network device, and the operation that the terminal device adjusts, in response to the response message, the value of the parameter of the first URSP corresponding to the rejection cause value may include: the terminal device adjusts the value of the parameter of the first rule corresponding to the rejection cause value to the value of the parameter of the first rule corresponding to the rejection cause value and suggested by the network device.

In other words, after the terminal device receives the response message, in a case that the network device includes a suggested value in the response message, the terminal device makes a modification according to the suggested value; and in a case that the suggested value is not included, the parameter in the rule corresponding to the rejection cause value may be adjusted according to the precedence of the parameter. For example, in a case that the reply of the network device is that the RAT access is not satisfied, the terminal device may select the RAT access having a higher precedence to re-initiate the establishment of the PDU session. In a case that the reply of the network device is that the RAT access is not satisfied and that the suggested RAT access of 3GPP access is carried in the reply, the terminal device may directly re-initiate the establishment of the PDU session based on the 3GPP access.

Optionally, the method may further include: the terminal device receives, from the network device, a second rule other than the first rule in the at least one rule in the URSP and the ID of the first rule; and the operation that the terminal device acquires the first rule according to an ID of a first rule may include: the terminal device acquires the first rule via a user plane according to the ID of the first rule after the second PDU session corresponding to the second rule is established, or the terminal device triggers the network device according to the ID of the first rule to send the first rule via a control plane.

The person skilled in the art should understand that the network device may send the URSP policy to the terminal device via a PCF in the process when the terminal device performs the network registration.

Optionally, the method may further include: the terminal device receives the ID of a server; and the operation that the terminal device acquires the first rule via a user plane according to the ID of the first rule after the second PDU session corresponding to the second rule is established may include: the terminal device acquires the first rule via the user plane according to the ID of the first rule and the ID of the server after the second PDU session corresponding to the second rule is established.

Optionally, the precedence of the second rule may be higher than that of the first rule.

In this embodiment of the disclosure, in order to alleviate the network pressure, under a condition where the URSP policy is oversize and the PCF cannot send the URSP policy to the terminal device completely via one signaling message, the PCF may send segmentations of the URSP comprising multiple rules to the terminal device via a control plane, for example, the PCT may group the multiple rules and send a group of rules in each message, or may prioritize the multiple rules to send segmentations of the URSP comprising the multiple rules initiatively, that is, send the rules with precedences from high to low. The terminal device may also send the ID of the required rule to the PCF once receiving one segmentation of rules, specifically, in a case that the PCF first sends the rule 1 and the rule 2 to the terminal device, the terminal device may feed the IDs of the rule 3 and the rule 4 to the PCF, so that the PCF can send the rule 3 and the rule 4 to the terminal device.

The PCF may also first send part of rules to the terminal device and also carry the IDs of another part of rules. After the terminal device establishes a user plane according to the part of rules, the terminal device may acquire the another part of rules according to the IDs of the another part of rules. Further, the PCF may send an ID of a server which stores the another part of rules to the terminal device. After the terminal device establishes the user plane according to the part of rules, the terminal device may acquire the another part of rules from the server corresponding to the user plane according to the IDs of the another part of rules.

Since the URSP policy can be acquired in form of segmentations, the network pressure can be effectively reduced, and the communication flexibility can be improved.

Optionally, the operation that a terminal device acquires, according to an ID of each rule in at least one rule in a URSP, the at least one rule respectively may include: in the process when the terminal device performs network registration, the terminal device acquires the at least one rule according to the ID of each rule in the at least one rule.

FIG. 6 illustrates a schematic block diagram of a method 600 for transmitting data according to an embodiment of the disclosure. As shown in FIG. 6, the method 600 may include the following contents in part or as a whole.

At S610: in the process when a terminal device performs network registration, a network device sends multiple rules in a URSP to the terminal device via multiple messages.

Therefore, according to the method for transmitting data in this embodiment of the disclosure, since the URSP policy can be acquired in form of segmentations, the network pressure can be effectively reduced, and the communication flexibility can be improved.

Optionally, the operation that in the process when a terminal device performs network registration, a network device sends multiple rules in a URSP to the terminal device via multiple messages may include: in the process when the terminal device performs the network registration, the network device sequentially sends the multiple rules to the terminal device via multiple messages on a control plane according to precedences of the multiple rules.

Optionally, the network device may be a PCF device.

Figure 7:
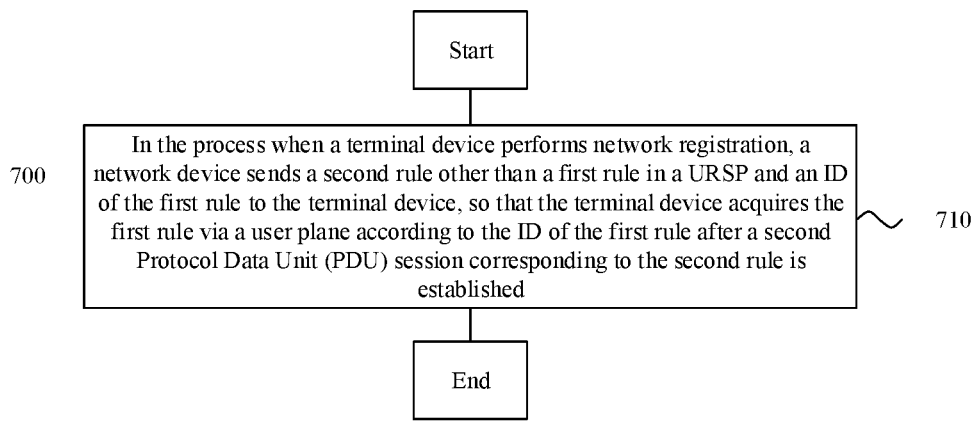
FIG. 7 illustrates a still another schematic block diagram of a method for transmitting data according to an embodiment of the disclosure.

FIG. 7 illustrates a schematic block diagram of a method 700 for transmitting data according to an embodiment of the disclosure. As shown in FIG. 7, the method 700 may include the following contents in part or as a whole.

At S710: in the process when a terminal device performs network registration, a network device sends a second rule other than a first rule in a URSP and an ID of the first rule to the terminal device, so that the terminal device acquires the first rule via a user plane according to the ID of the first rule after a second Protocol Data Unit (PDU) session corresponding to the second rule is established.

According to the method for transmitting data in this embodiment of the disclosure, since the URSP policy can be acquired in segmentations, the network pressure can be effectively reduced, and the communication flexibility can be improved.

Optionally, the method may further include: the network device sends the ID of a server to the terminal device, so that the terminal device acquires the first rule via the user plane according to the ID of the first rule and the ID of the server after the second PDU session corresponding to the second rule is established.

Optionally, the network device may be a PCF device.

It is to be understood that the interaction between the network device and the terminal device, relevant characteristics and functions and the like described from the angle of the network device correspond to the relevant characteristics and functions described from the angle of the terminal device. Relevant content has been described in detail in the method 600, and will be repeated herein.

It is further to be understood that the sequence numbers of the foregoing processes in various embodiments of the disclosure do not mean execution sequences. The execution sequences of the processes may be determined according to functions and internal logics of the processes, and should not be construed as any limitation to the implementation processes of the embodiments of the disclosure.

The method for transmitting data according to the embodiments of the disclosure is described above in detail. Hereinafter, an apparatus for transmitting data according to the embodiments of the disclosure is described in combination with FIG. 8 to FIG. 17. The technical features described in the method embodiment are applicable to the following apparatus embodiment.

Figure 8:
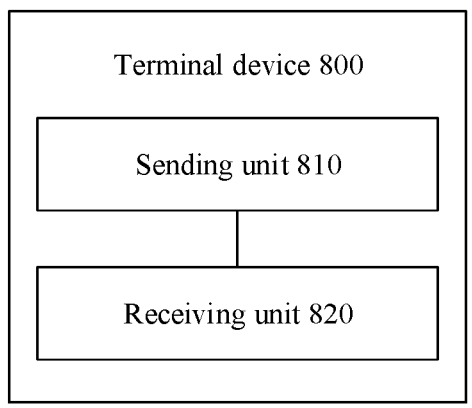
FIG. 8 illustrates a schematic block diagram of a terminal device according to an embodiment of the disclosure.

FIG. 8 illustrates a schematic block diagram of a terminal device 800 according to an embodiment of the disclosure. As shown in FIG. 8, the terminal device 800 may include: a sending unit 810 and a receiving unit 820.

The sending unit 810 is configured to send a first request message to a network device, the first request message being for applying for carrying out, in a first PDU session, session establishment involving N data flows.

The receiving unit 820 is configured to receive a response message sent by the network device in response to the first request message, the response message being for indicating that the network device rejects to carry out, in the first PDU session, session establishment involving M data flows of the N data flows, the N and the M being both a positive integer, and the N being greater than or equal to the M.

Therefore, according to the terminal device in this embodiment of the disclosure, by receiving the condition of session establishment fed back by the network device, the terminal device can adjust a session establishment policy timely, and the performance of the communication system can be improved.

Optionally, the response message may include a rejection cause value, and the rejection cause value may be for indicating that the first PDU session does not support the M data flows.

Optionally, the response message may include an ID of each data flow of the M data flows.

Optionally, the sending unit may be further configured to send a second request message to the network device in response to the response message, the second request message being for applying for carrying out, in a second PDU session, session establishment involving at least one data flow of the M data flows.

Optionally, the first request message may include the ID of the first PDU session, the second request message may include the ID of the second PDU session, and the second PDU session may be the first PDU session after the ID of the first PDU session is adjusted.

Optionally, before the terminal device responds to the response message, the terminal device may further include: a processing unit, configured to adjust an establishment parameter of the second PDU session rather than the first PDU session according to the M data flows.

Optionally, the response message may include the ID of the second PDU session.

Optionally, the network device may be an SMF device.

It is to be understood that the terminal device 800 according to this embodiment of the disclosure may correspond to the terminal device in the method embodiment of the disclosure. Furthermore, the above and other operations and/or functions of each unit in the terminal device 800 are respectively intended to implement a corresponding process of the terminal device in the method in FIG. 2 and FIG. 3 and will not be repeated for the briefness.

Figure 9:
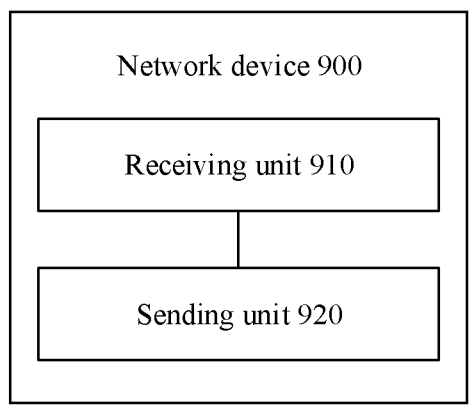
FIG. 9 illustrates a schematic block diagram of a network device according to an embodiment of the disclosure.

FIG. 9 illustrates a schematic block diagram of a network device 900 according to an embodiment of the disclosure. As shown in FIG. 9, the network device 900 may include: a receiving unit 910 and a sending unit 920.

The receiving unit 910 is configured to receive a first request message sent by a terminal device, the first request message being for applying for carrying out, in a first PDU session, session establishment involving N data flows.

The sending unit 920 is configured to send a response message in response to the first request message to the terminal device, the response message being for indicating that the network device rejects to carry out, in the first PDU session, the session establishment involving M data flows of the N data flows, the N and the M being both a positive integer, and the N being greater than or equal to the M.

Therefore, the network device in this embodiment of the disclosure, by feeding the condition of session establishment back to the terminal device, can enable the terminal device to adjust a session establishment policy timely, so that the performance of the communication system can be improved.

Optionally, the response message may include a rejection cause value, and the rejection cause value may be for indicating that the first PDU session does not support the M data flows.

Optionally, the response message may include an ID of each data flow of the M data flows.

Optionally, the receiving unit may be further configured to receive a second request message sent by the terminal device, the second request message being for applying for carrying out, in a second PDU session, session establishment involving at least one data flow of the M data flows.

Optionally, the response message may include the ID of the second PDU session, rather than the first PDU session, suggested by the network device.

Optionally, the network device may be an SMF device, and the network device may further include: a processing unit, configured to trigger an access network device according to the first request message to carry out the session establishment involving the N data flows in the first PDU session; and the receiving unit may be further configured to receive a data flow list sent by the access network device and corresponding to the first PDU session, the data flow list including the M data flows or (N-M) data flows of the N data flows received by the first PDU session.

It is to be understood that the network device 900 according to this embodiment of the disclosure may correspond to the terminal device in the method embodiment of the disclosure. Furthermore, the above and other operations and/or functions of each unit in the network device 900 are respectively intended to implement a corresponding process of the network device in the method in FIG. 4 and will not be repeated for the briefness.

Figure 10:
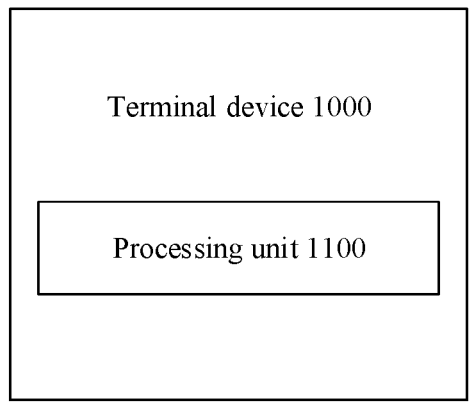
FIG. 10 illustrates another schematic block diagram of a terminal device according to an embodiment of the disclosure.

FIG. 10 illustrates a schematic block diagram of a terminal device 1000 according to an embodiment of the disclosure. As shown in FIG. 10, the terminal device 1000 may include: a processing unit 1100.

The processing unit 1100 is configured to acquire, according to an ID of each rule in at least one rule in a URSP, the at least one rule respectively.

The processing unit 1100 is further configured to initiate establishment or modification of at least one PDU session in one-to-one correspondence with the at least one rule to a network device respectively according to the at least one rule.

The terminal device in this embodiment of the disclosure may acquire some rule according to the IDs of the rules, and the network device no longer needs to send all rules to the terminal device at a time, so that the pressure of the network device can be relieved, and the communication flexibility can be improved.

Optionally, the at least one rule may be multiple rules, and the processing unit may be specifically configured to: initiate the establishment or modification of the multiple PDU sessions to the network device according to precedences of the multiple rules.

Optionally, the first rule in the at least one rule may include at least one parameter of the following parameters: an RAT, a session and service continuity mode, an S-NSSAI, a shunt type, a DNN and a data flow filter.

Optionally, the first parameter in the at least one parameter may include multiple values indicative of precedences, and the processing unit may be specifically configured to: initiate, according to the precedences of the multiple values, the establishment or modification of the first PDU session to the network device.

Optionally, the processing unit may be further configured to send a first request message to the network device according to the first rule, the first request message being for requesting the network device to carry out session establishment involving N data flows in the first PDU session; and after the processing unit initiates the establishment or modification of the first PDU session to the network device according to the first rule, the terminal device may further include: a receiving unit, configured to receive a response message sent by the network device in response to the first request message, the response message being for indicating that the network device rejects to carry out the session establishment involving M data flows of the N data flows in the first PDU session, the N and the M being both a positive integer, and the N being greater than or equal to the M.

Optionally, the response message may include a rejection cause value, and the rejection cause value may be for indicating at least one condition of the following conditions: not supported PDU session, not allowed RAT access, not supported session or service continuity mode, S-NSSAI is wrong, not supported DNN, and an ID of the PDU session fails to be identified.

Optionally, the terminal device may further include: the processing unit, further configured to adjust, in response to the response message, a value of a parameter of the first rule corresponding to the rejection cause value; and a sending unit, configured to send a second request message to the network device according to the adjusted first rule, the second request message being for requesting the network device to carry out, in the first PDU session, the session establishment involving at least one data flow of the M data flows.

Optionally, the parameter of the first rule corresponding to the rejection cause value may include multiple values indicative of precedences, and the processing unit may be further configured to adjust, in response to the response message, the value of the parameter of the first URSP corresponding to the rejection cause value to a value having a higher precedence than that when establishment of a first PDU session was initiated last time.

Optionally, the response message may include the value of the parameter of the first rule corresponding to the rejection cause value and suggested by the network device, and the operation that the processing unit adjusts, in response to the response message, the value of the parameter of the first URSP corresponding to the rejection cause value may include: the processing unit adjusts the value of the parameter of the first rule corresponding to the rejection cause value as the value of the parameter of the first rule corresponding to the rejection cause value and suggested by the network device.

Optionally, the terminal device may further include: a receiving unit, configured to receive a second rule other than the first rule in the at least one rule in the URSP and the ID of the first rule from the network device; and the operation that the processing unit acquires, according to an ID of a first rule, the first rule may include:

the processing unit acquires the first rule via a user plane according to the ID of the first rule after the second PDU session corresponding to the second rule is established, or the processing unit triggers the network device according to the ID of the first rule to send the first rule via a control plane.

Optionally, the receiving unit may be further configured to receive an ID of a server; and the operation that the processing unit acquires the first rule via a user plane according to the ID of the first rule after the second PDU session corresponding to the second rule is established may include: the processing unit acquires the first rule via the user plane according to the ID of the first rule and the ID of the server after the second PDU session corresponding to the second rule is established.

Optionally, the precedence of the second rule may be higher than that of the first rule.

Optionally, the operation that the processing unit respectively acquires, according to an ID of each rule in at least one rule in a URSP, the at least one rule may include: in the process when the terminal device performs network registration, the processing unit acquires the at least one rule according to the ID of each rule in the at least one rule.

It is to be understood that the terminal device 1000 according to this embodiment of the disclosure may correspond to the terminal device in the method embodiment of the disclosure. Furthermore, the above and other operations and/or functions of each unit in the terminal device 1000 are respectively intended to implement a corresponding process of the terminal device in the method in FIG. 5 and will not be repeated for the briefness.

Figure 11:
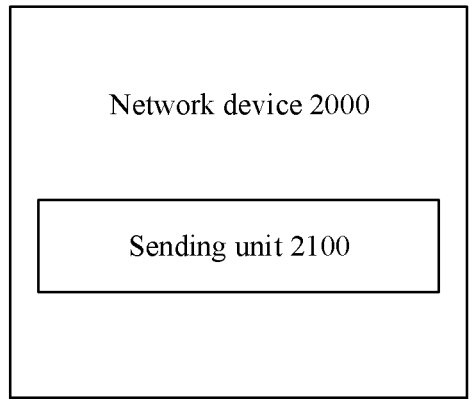
FIG. 11 illustrates another schematic block diagram of a network device according to an embodiment of the disclosure.

FIG. 11 illustrates a schematic block diagram of a network device 2000 according to an embodiment of the disclosure. As shown in FIG. 11, the network device 2000 may include: a sending unit 2100.

The sending unit 2100 is configured to send, in the process when a terminal device performs network registration, multiple rules in a URSP to the terminal device via multiple messages.

Therefore, according to the network device in this embodiment of the disclosure, since the URSP policy can be acquired in segmentations, the network pressure can be effectively reduced, and the communication flexibility can be improved.

Optionally, in the process when the terminal device performs the network registration, the processing unit may be specifically configured to: sequentially send the multiple rules to the terminal device via multiple messages on a control plane according to precedences of the multiple rules.

Optionally, the network device may be a PCF device.

It is to be understood that the terminal device 2000 according to this embodiment of the disclosure may correspond to the terminal device in the method embodiment of the disclosure. Furthermore, the above and other operations and/or functions of each unit in the terminal device 2000 are respectively intended to implement a corresponding process of the terminal device in the method in FIG. 6 and will not be repeated for the briefness.

Figure 12:
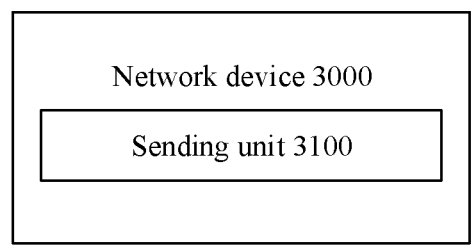
FIG. 12 illustrates a still another schematic block diagram of a network device according to an embodiment of the disclosure.

FIG. 12 illustrates a schematic block diagram of a network device 3000 according to an embodiment of the disclosure. As shown in FIG. 12, the network device 3000 may include: a sending unit 3100.

The sending unit 3100 is configured to send, in the process when a terminal device performs network registration, a second rule other than a first rule in a URSP and an ID of the first rule to the terminal device, so that the terminal device acquires the first rule via a user plane according to the ID of the first rule after a second Protocol Data Unit (PDU) session corresponding to the second rule is established.

Therefore, according to the network device in this embodiment of the disclosure, since the URSP policy can be acquired in segmentations, the network pressure may be effectively reduced, and the communication flexibility can be improved.

Optionally, the sending unit may be further configured to send the ID of a server to the terminal device, so that the terminal device acquires the first rule via the user plane according to the ID of the first rule and the ID of the server after the second PDU session corresponding to the second rule is established.

Optionally, the network device may be a PCF device.

It is to be understood that the terminal device 3000 according to this embodiment of the disclosure may correspond to the terminal device in the method embodiment of the disclosure. Furthermore, the above and other operations and/or functions of each unit in the terminal device 3000 are respectively intended to implement a corresponding process of the terminal device in the method in FIG. 7 and will not be repeated for the briefness.

Figure 13:
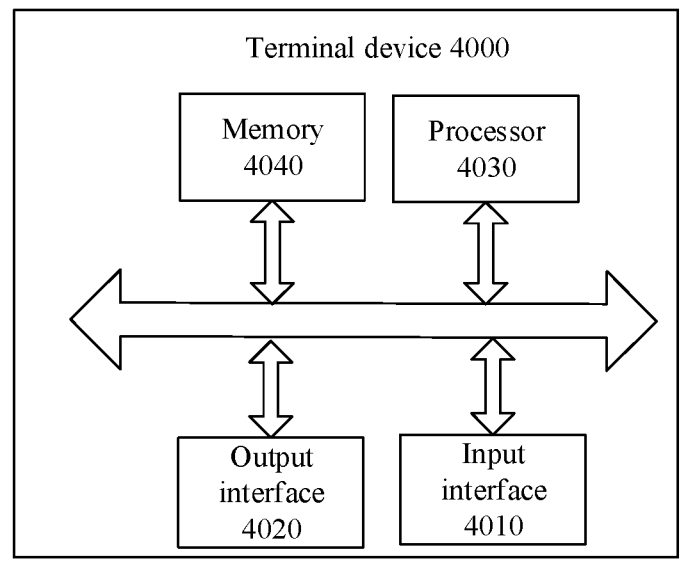
FIG. 13 illustrates a still another schematic block diagram of a terminal device according to an embodiment of the disclosure.

As shown in FIG. 13, an embodiment of the disclosure further provides a terminal device 4000. The terminal device 4000 may be the terminal device 800 in FIG. 8, and can be configured to execute the operations of the terminal device corresponding to the method 200 in FIG. 2. The terminal device 4000 may include: an input interface 4010, an output interface 4020, a processor 4030 and a memory 4040. The input interface 4010, the output interface 4020, the processor 4030 and the memory 4040 may be connected via a bus system. The memory 4040 is configured to store a program, an instruction or a code. The processor 4030 is configured to execute the program, the instruction or the code in the memory 4040, to control the input interface 4010 to receive a signal and control the output interface 4020 to send the signal, and complete the operations in the foregoing method embodiment.

Therefore, according to the terminal device in this embodiment of the disclosure, by receiving the condition of session establishment fed back by the network device, the terminal device can adjust a session establishment policy timely, and the performance of the communication system can be improved.

It is to be understood that, in this embodiment of the disclosure, the processor 4030 may be a Central Processing Unit (CPU), and the processor 4030 may also be another universal processor, a Digital Signal Processor (DSP), an Application Specific Integrated Circuit (ASIC), a Field Programmable Gate Array (FPGA) or another programmable logic device, separate gate or transistor logic device, separate hardware component and the like. The universal processor may be a microprocessor, or the processor may also be any conventional processor, etc.

The memory 4040 may include a Read-Only Memory (ROM) and a Random Access Memory (RAM) and provide an instruction and data for the processor 4030. A part of the processor 4040 may further include a nonvolatile random access memory. For example, the processor 4040 may further store information on a device type.

During implementation, all the contents of the method may be completed by means of the instruction in a form of an integrated logic circuit of hardware in the processor 4030 or software. The contents of the method disclosed in combination with this embodiment of the disclosure may be directly embodied as a hardware processor for execution and completion, or a combination of hardware and software modules in the processor for execution and completion. The software module may be located in a mature storage medium in the art such as the RAM, a flash memory, a programmable ROM or an electrically erasable programmable memory, and a register. The storage medium is located in the memory 4040. The processor 4030 reads information in the memory 4040, and completes the content of the above method in combination with hardware. In order to prevent repetition, the above will no longer be described in detail.

In one specific embodiment, the sending unit in the terminal device 800 may be implemented by the output interface 4020 in FIG. 13, and the receiving unit in the terminal device 800 may be implemented by the input interface 4010 in FIG. 13.

Figure 14:
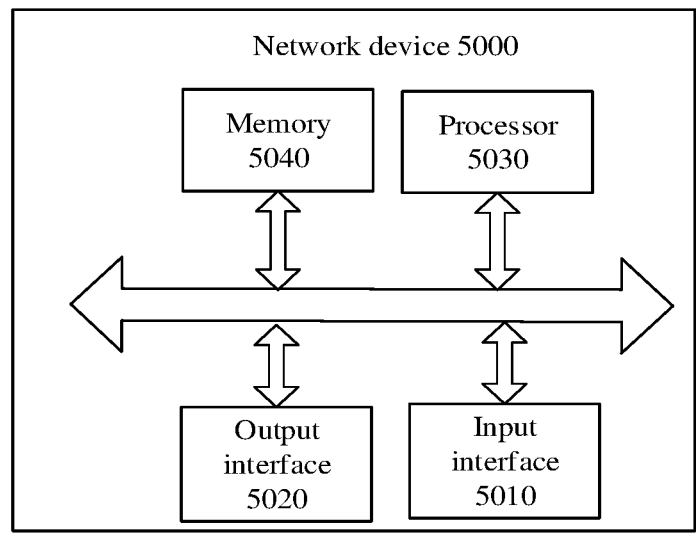
FIG. 14 illustrates a still another schematic block diagram of a network device according to an embodiment of the disclosure.

As shown in FIG. 14, an embodiment of the disclosure further provides a network device 5000. The network device 5000 may be the network device 900 in FIG. 9, and can be configured to execute all the operations of the network device corresponding to the method 400 in FIG. 4. The network device 5000 may include: an input interface 5010, an output interface 5020, a processor 5030 and a memory 5040. The input interface 5010, the output interface 5020, the processor 5030 and the memory 5040 may be connected via a bus system. The memory 5040 is configured to store a program, an instruction or a code. The processor 5030 is configured to execute the program, the instruction or the code in the memory 5040, to control the input interface 5010 to receive a signal, and control the output interface 5020 to send the signal and complete the operations in the foregoing method embodiment.

Therefore, the network device in this embodiment of the disclosure, by feeding the condition of session establishment back to the terminal device, can enable the terminal device to adjust a session establishment policy timely, and the performance of the communication system can be improved.

It is to be understood that, in this embodiment of the disclosure, the processor 5030 may be a CPU, and the processor 5030 may further be another universal processor, a DSP, an ASIC, an FPGA or another programmable logic device, separate gate or transistor logic device, separate hardware component and the like. The universal processor may be a microprocessor, or the processor may also be any conventional processor, etc.

The memory 5040 may include an ROM and an RAM and provide an instruction and data for the processor 5030. A part of the processor 5040 may further include a nonvolatile random access memory. For example, the processor 5040 may further store information on a device type.

During implementation, all the contents of the method may be completed by means of the instruction in a form of an integrated logic circuit of hardware in the processor 5030 or software. The contents of the method described in combination with this embodiment of the disclosure may be directly embodied as a hardware processor for execution and completion, or a combination of hardware and software modules in the processor for execution and completion. The software module may be located in a mature storage medium in the art such as the RAM, a flash memory, a programmable ROM or an electrically erasable programmable memory, and a register. The storage medium is located in the memory 5040. The processor 5030 reads information in the memory 5040, and completes the content of the above method in combination with hardware. In order to prevent repetition, the above will no longer be described in detail.

In one specific embodiment, the sending unit in the network device 900 may be implemented by the output interface 5020 in FIG. 14, and the receiving unit in the network device 900 may be implemented by the input interface 5010 in FIG. 14.

Figure 15:
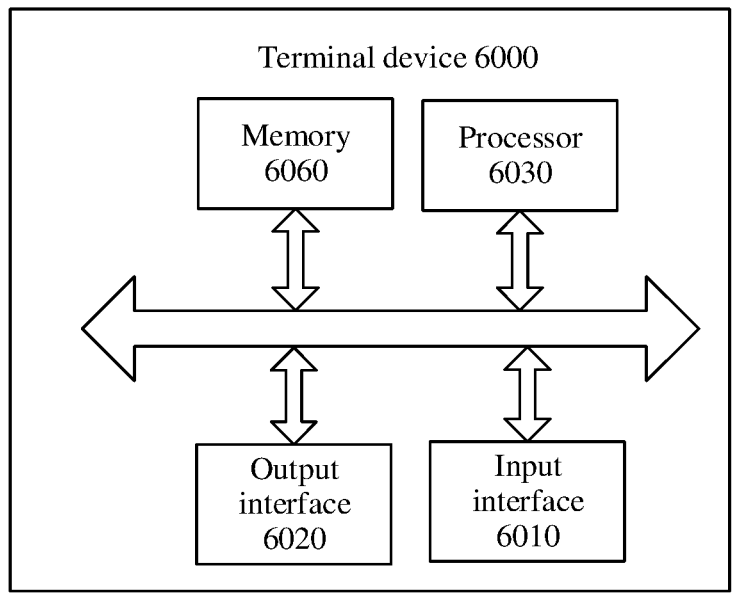
FIG. 15 illustrates a still another schematic block diagram of a terminal device according to an embodiment of the disclosure.

As shown in FIG. 15, an embodiment of the disclosure further provides a terminal device 6000. The terminal device 6000 may be the terminal device 1000 in FIG. 10, and can be configured to execute the operations of the terminal device corresponding to the method 500 in FIG. 5. The terminal device 6000 may include: an input interface 6010, an output interface 6020, a processor 6030 and a memory 6060. The input interface 6010, the output interface 6020, the processor 6030 and the memory 6060 may be connected via a bus system. The memory 6060 is configured to store a program, an instruction or a code. The processor 6030 is configured to execute the program, the instruction or the code in the memory 6060, to control the input interface 6010 to receive a signal, and control the output interface 6020 to send the signal and complete the operations in the foregoing method embodiment.

Therefore, the terminal device in this embodiment of the disclosure may acquire a rule according to the IDs of the rules, and the network device no longer needs to send all rules to the terminal device at a time, so that the pressure of the network device can be relieved, and the communication flexibility can be improved.

It is to be understood that, in this embodiment of the disclosure, the processor 6030 may be a Central Processing Unit (CPU), and the processor 6030 may further be other universal processor, a Digital Signal Processor (DSP), an Application Specific Integrated Circuit (ASIC), a Field Programmable Gate Array (FPGA) or other programmable logic device, separate gate or transistor logic device, separate hardware component and the like. The universal processor may be a microprocessor, or the processor may also be any conventional processor, etc.

The memory 6060 may include an ROM and an RAM and provide an instruction and data for the processor 6030. Part of the processor 6060 may further include a nonvolatile random access memory. For example, the processor 6060 may further store information on a device type.

During implementation, all the contents of the method may be completed by means of the instruction in a form of an integrated logic circuit of hardware in the processor 6030 or software. The content of the method disclosed in combination with this embodiment of the disclosure may be directly embodied as a hardware processor for execution and completion, or a combination of hardware and software modules in the processor for execution and completion. The software module may be located in a mature storage medium in the art such as the RAM, a flash memory, a programmable ROM or an electrically erasable programmable memory, and a register. The storage medium is located in the memory 6060. The processor 6030 reads information in the memory 6060, and completes the content of the above method in combination with hardware. In order to prevent repetition, the above will no longer be described in detail.

In one specific embodiment, the processing unit in the terminal device 1000 may be implemented by the processor 6030 in FIG. 15.

Figure 16:
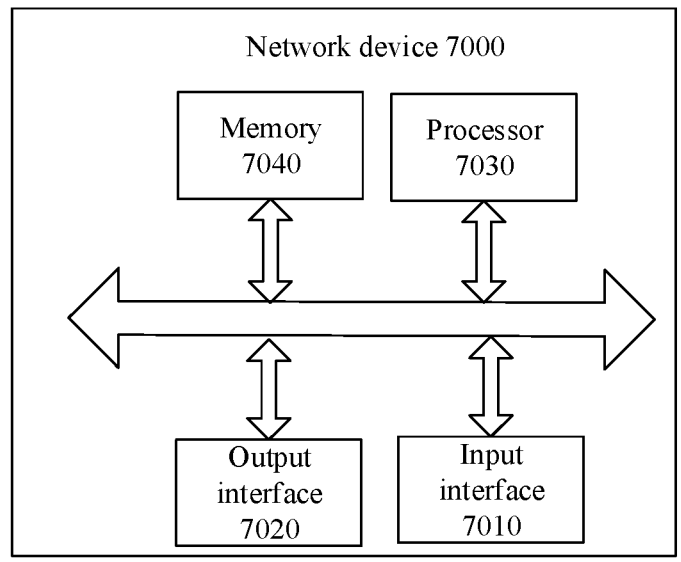
FIG. 16 illustrates a still another schematic block diagram of a network device according to an embodiment of the disclosure.

As shown in FIG. 16, an embodiment of the disclosure further provides a network device 7000. The network device 7000 may be the network device 2000 in FIG. 11, and can be configured to execute the operations of the network device corresponding to the method 600 in FIG. 6. The network device 7000 may include: an input interface 7010, an output interface 7020, a processor 7030 and a memory 7040. The input interface 7010, the output interface 7020, the processor 7030 and the memory 7040 may be connected via a bus system. The memory 7040 is configured to store a program, an instruction or a code. The processor 7030 is configured to execute the program, the instruction or the code in the memory 7040, to control the input interface 7010 to receive a signal, and control the output interface 7020 to send the signal and complete the operations in the foregoing method embodiment.

Therefore, according to the network device in this embodiment of the disclosure, since the URSP policy can be acquired in segmentations, the network pressure can be effectively reduced, and the communication flexibility can be improved.

It is to be understood that, in this embodiment of the disclosure, the processor 7030 may be a Central Processing Unit (CPU), and the processor 7030 may also be other universal processors, a Digital Signal Processor (DSP), an Application Specific Integrated Circuit (ASIC), a Field Programmable Gate Array (FPGA) or other programmable logic device, separate gate or transistor logic device, separate hardware component and the like. The universal processor may be a microprocessor, or the processor may also be any conventional processor, etc.

The memory 7040 may include an ROM and an RAM and provide an instruction and data for the processor 7030. A part of the processor 7040 may further include a nonvolatile random access memory. For example, the processor 7040 may further store information on a device type.

During implementation, all the contents of the method may be completed by means of the instruction in a form of an integrated logic circuit of hardware in the processor 7030 or software. The content of the method disclosed in combination with this embodiment of the disclosure may be directly embodied as a hardware processor for execution and completion, or a combination of hardware and software modules in the processor for execution and completion. The software module may be located in a mature storage medium in the art such as the RAM, a flash memory, a programmable ROM or an electrically erasable programmable memory, and a register. The storage medium is located in the memory 7040. The processor 7030 reads information in the memory 7040, and completes the content of the above method in combination with hardware. In order to prevent repetition, the above will no longer be described in detail.

In one specific embodiment, the sending unit in the network device 2000 may be implemented by the output interface 7020 in FIG. 16.

Figure 17:
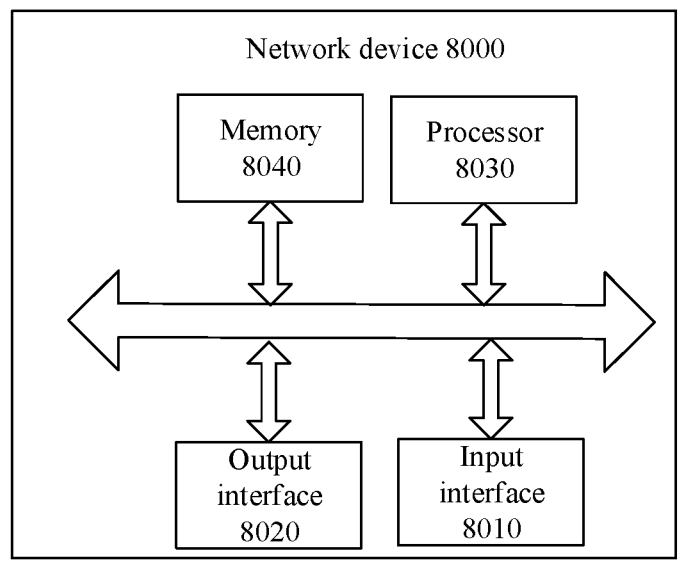
FIG. 17 illustrates a still another schematic block diagram of a network device according to an embodiment of the disclosure.

As shown in FIG. 17, an embodiment of the disclosure further provides a network device 8000. The network device 8000 may be the network device 3000 in FIG. 12, and can be configured to execute a content of the network device corresponding to the method 700 in FIG. 7. The network device 8000 may include: an input interface 8010, an output interface 8020, a processor 8030 and a memory 8040. The input interface 8010, the output interface 8020, the processor 8030 and the memory 8040 may be connected via a bus system. The memory 8040 is configured to store a program, an instruction or a code. The processor 8030 is configured to execute the program, the instruction or the code in the memory 8040, to control the input interface 8010 to receive a signal, and control the output interface 8020 to send the signal and complete the operations in the foregoing method embodiment.

Therefore, according to the network device in this embodiment of the disclosure, since the URSP policy can be acquired in segmentations, the network pressure can be effectively reduced, and the communication flexibility can be improved.

It is to be understood that, in this embodiment of the disclosure, the processor 8030 may be a Central Processing Unit (CPU), and the processor 8030 may also be other universal processor, a Digital Signal Processor (DSP), an Application Specific Integrated Circuit (ASIC), a Field Programmable Gate Array (FPGA) or other programmable logic device, separate gate or transistor logic device, separate hardware component and the like. The universal processor may be a microprocessor, or the processor may also be any conventional processor, etc.

The memory 8040 may include an ROM and an RAM and provide an instruction and data for the processor 8030. Part of the processor 8040 may further include a nonvolatile random access memory. For example, the processor 8040 may further store information on a device type.

During implementation, each content of the method may be completed by means of the instruction in a form of an integrated logic circuit of hardware in the processor 8030 or software. The content of the method disclosed in combination with this embodiment of the disclosure may be directly embodied as a hardware processor for execution and completion, or a combination of hardware and software modules in the processor for execution and completion. The software module may be located in a mature storage medium in the art such as the RAM, a flash memory, a programmable ROM or an electrically erasable programmable memory, and a register. The storage medium may be located in the memory 8040. The processor 8030 may read information in the memory 8040, and complete the content of the above method in combination with hardware. In order to prevent repetition, the above will not be described in detail.

In one specific embodiment, the sending unit in the network device 3000 may be implemented by the output interface 8020 in FIG. 17.

A person of ordinary skill in the art may be aware that, in combination with the examples described in the embodiments described in this specification, units and algorithm steps may be implemented by electronic hardware, computer software or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by the person skilled in the art that, for the purpose of convenient and brief description, a detailed working process of the foregoing system, apparatus, and unit may be referred to a corresponding process in the foregoing method embodiment, and details are not described herein again.

In the several embodiments provided in the disclosure, it is to be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The computer software product may be stored in a storage medium and may include several instructions for instructing a computer device (which may be a personal computer, a server, or a network device) to perform all or some of the steps of the methods described in the embodiments of the disclosure. The foregoing storage medium may include: any medium that can store a program code, such as a U disk, a mobile hard disk, an ROM, an RAM, a magnetic disk, or an optical disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting data, comprising:
   initiating, by a terminal device, establishment or modification of a first Protocol Data Unit (PDU) session to a network device according to a first rule in at least one rule in a UE Route Selection Policy (URSP),
   wherein initiating, by the terminal device establishment or modification of the first PDU session to the network device according to the first rule in the at least one rule comprises:
      sending, by the terminal device, a first request message to the network device according to the first rule, wherein the first request message is for requesting the network device to carry out, in the first PDU session, session establishment involving N data flows.

2. The method of claim 1, wherein each of the at least one rule has a precedence and includes an identifier (ID), the ID is configured for the terminal device to acquire a corresponding rule according to the identifier.

3. The method of claim 1, wherein the first rule in the at least one rule comprises at least one parameter of following parameters:
   a Radio Access Technology (RAT), a session and service continuity mode, a Single-Network Slice Selection Assistance Information (S-NSSAI), a shunt type, and a Data Network Name (DNN).

4. The method of claim 1, wherein
   after the terminal device initiates the establishment or modification of the first PDU session to the network device according to the first rule, the method further comprises:
      receiving, by the terminal device, a response message sent by the network device in response to the first request message, wherein the response message is for indicating that the network device rejects to establish a data flow in the first PDU session.

5. The method of claim 4, wherein the response message includes a rejection cause value, and the rejection cause value is for indicating at least one condition of following conditions that:
   not supported PDU session,
   not allowed RAT access,
   not supported session or service continuity mode,
   S-NSSAI is wrong, not supported DNN, and
   an ID of the PDU session fails to be identified.

6. The method of claim 5, further comprising:
   adjusting, by the terminal device, in response to the response message, a value of a parameter of the first rule corresponding to the rejection cause value; and
   sending, by the terminal device, a second request message to the network device according to the adjusted value of the parameter of the first rule, wherein the second request message is for requesting establishment of a PDU session.

7. The method of claim 1, further comprising:
   receiving, by the terminal device, segmentations of the URSP which comprises at least one rule from a Policy Control Function (PCF) via a control plane.

8. The method of claim 7,
   wherein receiving, by the terminal device, the segmentations of the URSP which comprises at least one rule from the Policy Control Function (PCF) via the control plane comprises:
      receiving a group of rules through a message from the PCF after the at least one rule are grouped by the PCF; or
      receiving the segmentations of the URSP which comprises the at least one rule from the PCF that initiatively sends the at least one rule according to a precedence of each of the at least one rule.

9. A terminal device, comprising:
   a processor, and
   a memory storing instructions executable by the processor,
   wherein the processor is configured to initiate establishment or modification of a first Protocol Data Unit (PDU) session to a network device according to a first rule in at least one rule in a UE Route Selection Policy (URSP),
   wherein the processor is further configured to send a first request message to the network device according to the first rule, wherein the first request message is for requesting the network device to carry out, in the first PDU session, session establishment involving N data flows.

10. The terminal device of claim 9, wherein each of the at least one rule has a precedence and includes an identifier (ID), the ID is configured for the terminal device to acquire a corresponding rule according to the identifier.

11. The terminal device of claim 9, wherein the first rule in the at least one rule comprises at least one parameter of following parameters:
   a Radio Access Technology (RAT), a session and service continuity mode, a Single-Network Slice Selection Assistance Information (S-NSSAI), a shunt type, and a Data Network Name (DNN).

12. The terminal device of claim 9, wherein
   after the processor initiates the establishment or modification of the first PDU session to the network device according to the first rule, the terminal device further comprises:
      an input interface, configured to receive a response message sent by the network device in response to the first request message, wherein the response message is for indicating that the network device rejects to establish a data flow in the first PDU session.

13. The terminal device of claim 12, wherein the response message includes a rejection cause value, and the rejection cause value is for indicating at least one condition of following conditions:
not supported PDU session,
not allowed RAT access,
not supported session or service continuity mode,
S-NSSAI is wrong, not supported DNN, and
an ID of the PDU session fails to be identified.

14. The terminal device of claim 13, wherein
the processor is further configured to adjust, in response to the response message, a value of a parameter of the first rule corresponding to the rejection cause value; and
the terminal device further comprises: an output interface, configured to send a second request message to the network device according to the adjusted first rule, wherein the second request message is for requesting establishment of a PDU session.

15. The terminal device of claim 9, wherein the processor is further configured to control an input interface to receive segmentations of the URSP which comprises at least one rule from a Policy Control Function (PCF) via a control plane.

16. The terminal device of claim 15, wherein the input interface is further configured to:
receive a group of rules through a message from the PCF after the at least one rule are grouped by the PCF; or
receive the segmentations of the URSP which comprises the at least one rule from the PCF that initiatively sends the at least one rule according to a precedence of each of the at least one rule.

* * * * *